Patented Apr. 15, 1941

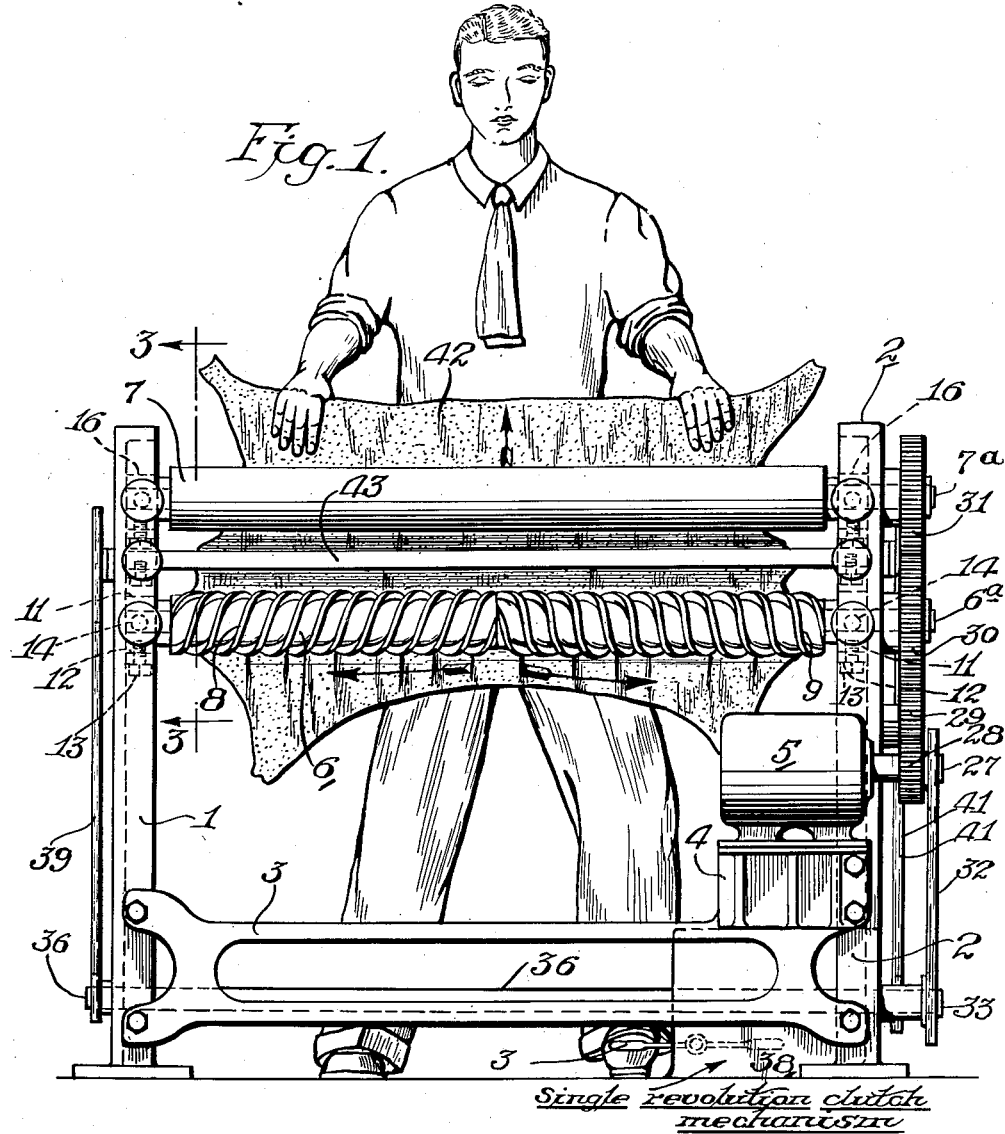

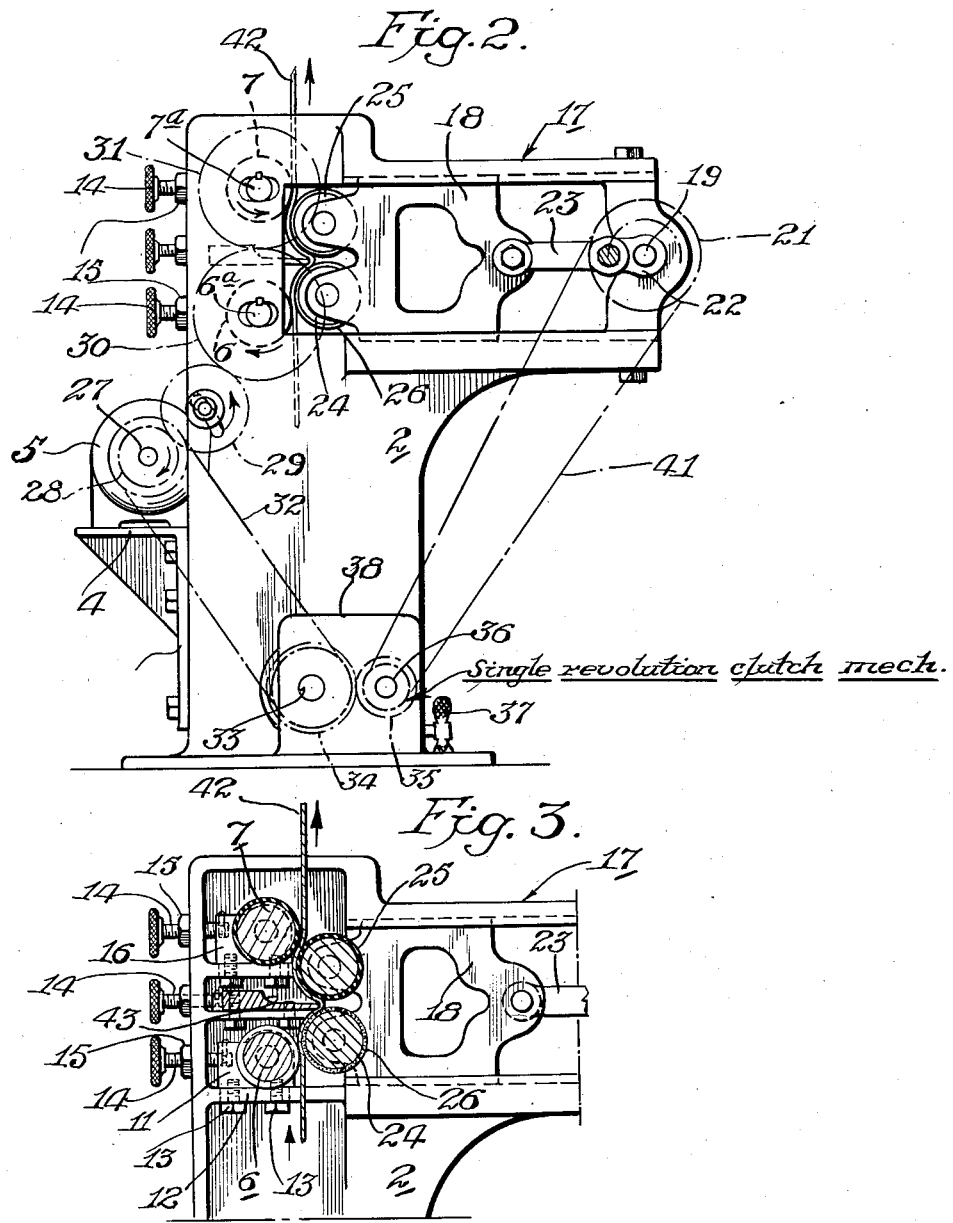

2,238,413

UNITED STATES PATENT OFFICE 2,238,413

STAKING MACHINE

Larner Doughty, Somerdale, and Lawrence Anthony Ladner, Camden, N. J., assignors to Peerless Kid Company, Camden, N. J., a corporation of New Jersey Application November 23, 1938, Serial No. 242,096

4 Claims. (Cl. 149—20)

This invention relates to improvements in staking machines, and the principal object of the invention is to provide a machine of this class that shall be characterized by relative simplicity of form, high functional efficiency and rapidity of operation.

Another object of the invention is to provide a machine that will be highly flexible in operation, in the sense that it will permit the operator to work the skin to best advantage, and which will relieve the operator of much of the heavy manual labor entailed in the operation of the staking machines of prior conventional type.

Still another object of the invention is to provide a machine which may be readily and accurately adjusted for efficient working of skins of different grades and weight.

In the attached drawings:

Figure 1 is a rear elevational view of a machine made in accordance with our invention;

Fig. 2 is an end elevation of the machine, and

Fig. 3 is a fragmentary sectional view on the line 3—3, Fig. 1.

With reference to the drawings, the machine as therein illustrated comprises a framework consisting of two end members or standards 1 and 2 respectively, and a transverse rear member 3. In the present instance, the transverse member 3 is formed with a bracket 4 which supports an electric motor 5 constituting the prime mover of the machine.

Journaled in and extending transversely between the standards 1 and 2 are two rolls 6 and 7, the surface of the roll 6 being formed as shown in Fig. 1 with helices 8 and 9, these helices extending in reverse directions from the mid section of the roll. The roll 7 is a smooth-faced roll, and is sheathed with rubber for traction purposes, as hereinafter set forth. The opposite ends of the roll 6 are journaled in trunnion blocks 11, 11, and these blocks are adjustably mounted in the standards 1 and 2 respectively, as illustrated in Fig. 3. Each of the blocks 11 rests slidably upon a rib 12 formed in the standard, and is held in place by two screws 13, 13 which extend upwardly through a slot in the said rib. Threaded through the back of the standard is an adjusting screw 14, and the inner end of this screw is rotatably secured to the block 11. A lock nut 15 is provided on the adjusting screw 14 to lock this screw in position. It will be apparent that by releasing the screws 13, 13 and the lock nut 15, the block 11 may be adjusted fore and aft of the machine through the medium of the screw 14, and may again be secured in adjusted position by retightening the screws 13, 13 and the lock nut 15. The roll 7 is similarly journaled in adjustable trunnion blocks 16.

Each of the standards 1 and 2 is provided at the front of the machine with an extension 17 in which is formed a guideway for a cross head 18. Journaled at the forward end of the extension 17 is a stub shaft 19, the outer end of which carries a pulley 21 and the inner end a crank 22. The crank 22 is operatively connected by a rod 23 with the cross head 18. As the shaft 19 is rotated, by means hereinafter described, the cross head 18 will be traversed in the extension 17. Journaled in and extending transversely between the cross heads 18, 18 are two rolls 24 and 25 which are adapted respectively to coact with the rolls 6 and 7. To this end, the roll 24 is provided with a cover 26 of felt, while the roll 25 is sheathed with rubber and is thereby adapted for coaction with the like roll 7.

Secured on the shaft 27 of the motor 5 is a toothed pinion 28 which is connected through an idler gear 29 with a gear 30 on the extended trunnion 6a of the roll 6, and the gear 30 in turn meshes with a gear 31 on the extended trunnion 7a of the roll 7. Preferably and as illustrated, the gear 31 is slightly smaller than the gear 30 whereby the speed of rotation of the roll 7 will be slightly greater than that of the roll 6.

The motor shaft 27 is also connected through a belt 32 with a shaft 33 at the bottom of the standard 2. Loosely mounted on the shaft 33 is a gear 34 which meshes with a gear 35 fixed on a shaft 36, this latter shaft being journaled in and extending between the standards 1 and 2. The gear 34 may be operatively connected to the shaft 33 at the will of the operator through the medium of a single-revolution clutch controlled by a pedal 37. This clutch mechanism, which may be of standard design, is housed in the present instance in a casing 38 at the inner side and at the bottom of the standard 2. The opposite ends of the shaft 36 are connected respectively through belts 39 and 41 with the crank shafts 19 of the cross head assemblies previously described, and the arrangement is such that following engagement of the clutch mechanism, the shafts 19 will be given one-half revolution, or will be rotated through an angle of 180° before the clutch is automatically disengaged. Thus for each manipulation of the treadle 37, the cross heads 18 will be moved from one extreme position, as shown in Fig. 2, to the opposite extreme position, in which the rolls 24 and 25 will be withdrawn from the companion rolls 6 and 7.

Referring to Fig. 3, it will be noted that the rolls 6 and 7 are so adjusted that when the cross head 18 and the rolls 24 and 25 are in the advanced position, as illustrated, predetermined pressures will be exerted by the two sets of rolls upon a skin 42 which has been inserted between the rolls during the period that the clamping rolls 24 and 25 have been retracted. Thus when the cross head is again moved forward by actuation of the treadle 37, the skin 42 will in effect be clamped between the feed rolls 7 and 25 and with lesser force between the roll 6 and its companion roll 24. As indicated by the arrows in Figs. 2 and 3, the rotation of the roll 7 is such as to tend to draw the skin upwardly and away from the rolls 6 and 24. The roll 6, on the other hand, as indicated in Fig. 1, is rotated oppositely to the roll 7, and thereby tends to draw the skin downwardly against the pull of the rolls 7 and 25. The pressure of the rolls 7 and 25, however, is adjusted with respect to the pressure of the rolls 6 and 24, so that the pull of the first pair of rolls prevails over that of the second, and the skin is drawn upwardly by the rolls 7 and 25, to be ejected eventually at the top of the machine. The helices 8 and 9 of the roll 6 are so arranged with respect to the direction of rotation that they exert forces on the skin tending to draw the latter from the center outwardly and downwardly, so that this roll with its companion felt-covered roll 24 functions to spread and smooth the skin and to thereby remove all wrinkles and creases before it passes to the rolls 7 and 25.

Mounted on and extending between the standards 1 and 2 in a position between the rolls 6 and 7 is a staking blade 43, the forward end of this blade extending to a point between the rolls 24 and 25, as shown in Figs. 2 and 3. The blade 43 is adjustably mounted in the standards after the manner of the blocks 11 and 16 previously described, and may, therefore, be adjusted fore and aft to vary the position of the forward edge of the blade with respect to the rolls 24 and 25. The blade is so adjusted that the skin, when the rolls 24 and 25 are in the advanced position as shown in the drawings, is flexed sharply around the forward edge of the blade. As the skin is drawn upwardly by the rolls 7 and 25 as previously described, it is bent sharply around the forward edge of the blade, thereby effecting the staking operation.

In operation, the machine is actuated by the operator through the treadle 37 and the associated single-revolution clutch mechanism to retract the clamping rolls 24 and 25 from the advanced or operative position and away from the rolls 6 and 7. The operator then inserts a skin after the manner illustrated in Fig. 1 by holding the skin at one edge and permitting it to drop downwardly between the rolls. Still retaining a hold on the upper edge of the skin, the operator now presses the treadle to effect engagement of the clutch, thereby causing the cross head 18 to be advanced and bringing the rolls 24 and 25 into operative relation with respect to the companion rolls 6 and 7. As the rolls 24 and 25 move forwardly into position, the skin is flexed sharply around the forward edge of the blade 43, and when the roll 25 has forced the skin into operative engagement with the active feed roll 7, these rolls function as previously described to rapidly draw the skin upwardly around the edge of the blade 43. As the skin is drawn upwardly, the rolls 6 and 24 function to spread and smooth out the lower part of the skin so that it passes flatly over the edge of the blade 43 and between the feed rolls 7 and 25. When the skin has cleared the latter pair of rolls, the operator again operates the treadle 37 to cause a retraction of the cross heads 18 and of the rolls 24 and 25. The skin is then reversed and reinserted between the rolls and the machine actuated as described to effect a working of the unfinished side. If the two passes of the skin through the machine are not sufficient to work the skin into the proper condition, the operations may be repeated, or any portion of the skin which requires extra working may be inserted in the machine to the exclusion of the remaining parts of the skin which are already in satisfactory condition. The operations may be carried out with extreme rapidity and with definite assurance of efficient results, the machine operating automatically to spread the skin and to draw it over the staking blade in smooth flat condition. The sole work required of the operator is to guide the skins into position in the machine and to actuate the treadle 37.

We claim:

1. In a skin-staking machine, the combination with a pair of feed rolls, of a pair of smoothing rolls, and an interposed staking blade, one roll of each pair constituting a clamping roll and being retractable to a position remote to the respective companion rolls and to the blade, mechanism for actuating said feed and smoothing rolls, and mechanism for retracting and advancing said clamping rolls, said latter mechanism comprising a manually-engageable clutch mechanism automatically disengageable to interrupt the travel of said clamping rolls at the termination of each of the advance and retraction movements.

2. In a skin staking machine, the combination with a substantially horizontally disposed staking blade, of a pair of feed rolls arranged above said blade and operative to draw a skin upwardly over the edge of said blade, means disposed below said blade for tensioning the skin and for smoothing the skin in advance of said blade, said tensioning and smoothing means comprising separable skin-clamping elements, and means for traversing one each of said rolls and elements between an advanced or operative position with respect to its companion roll and element and a retracted position horizontally remote to said companion roll and element, said last-named position affording a vertical space through which the skin may be lowered from above between the rolls and between the elements of said tensioning and smoothing means.

3. In a skin-staking machine, a set of substantially horizontal feed rolls, skin-tensioning means positioned below said rolls and comprising separable skin-clamping elements, a staking blade interposed between said rolls and said tensioning means, mechanism for separating the feed rolls and the said clamping elements respectively in the horizontal direction, so as to afford a vertical space through which the skin may be lowered from above between the rolls and between said elements, and for subsequently bringing said rolls and elements together into operative relation with respect to the skin, and means for actuating said rolls to draw the tensioned skin upwardly and over the edge of said blade.

4. In a skin-staking machine, a set of substantially horizontal feed rolls, skin-tensioning means positioned below said rolls and comprising separable skin-clamping elements, one each of said rolls and elements being relatively fixed and the other of said rolls and said elements being movable, a relatively fixed staking blade projecting inwardly between the relatively fixed roll and element for presentation of its free working edge in the space between said rolls and elements, mechanism for traversing the movable roll and element horizontally away from the free edge of said blade, so as to afford a vertical space through which the skin may be freely lowered from above between the rolls and between said elements, and for subsequently bringing said rolls and said elements together into operative relation with respect to the skin, and means for actuating said rolls to draw the tensioned skin upwardly and over the working edge of said blade.

LARNER DOUGHTY.
LAWRENCE ANTHONY LADNER.